June 4, 1963 C. G. HINZE 3,092,815

MAGNETIC CORE SENSING DEVICE

Filed Aug. 26, 1957

INVENTOR.
CHARLES G. HINZE

BY Richard E. Cummins

ATTORNEY

United States Patent Office 3,092,815
Patented June 4, 1963

3,092,815
MAGNETIC CORE SENSING DEVICE

Charles G. Hinze, San Jose, Calif., assignor to International Business Machines Corporation, New York, N.Y., a corporation of New York
Filed Aug. 26, 1957, Ser. No. 680,084
2 Claims. (Cl. 340—174.1)

This invention relates in general to sensing devices and in particular to a device for sensing coded indicia defined by material having low magnetic reluctance relative to the reluctance of the surrounding material.

In accordance with the present invention the reading surface of the sensing device comprises four pole tips arranged in a plane to define two intersecting slots. One set of diagonally adjacent pole tips is associated with a first core member provided with an emergizing winding and the other set of diagonally adjacent pole tips is associated with a second core member provided with a sensing winding. During a sensing operation the energizing winding is magnetically coupled to the sensing winding through the core members and the low reluctance material which defines the coded indicia being sensed, so that a signal is provided at the terminals of the sensing winding. Where the shape of the coded indicia corresponds to the shape of the intersecting slots, the output signal may be varied in accordance with the angle between the slot and the sensed indicia.

It is therefore an object of the present invention to provide an improved sensing device.

Another object of the present invention is to provide a sensing device wherein coded indicia being sensed magnetically couple an energizing winding to a sensing winding.

A further object of the present invention is to provide a sensing device in which an output signal is obtained as a result of coupling one magnetic circuit with another circuit through the indicia being sensed.

A still further object of the present invention is to provide a sensing device whose output signal varies in accordance with the angle at which the coded indicia are disposed when the drive winding of the device is energized.

Other objects of the invention will be pointed out in the following description and claims and illustrated in the accompanying drawings, which disclosed, by way of example, the principle of the invention and the best mode which has been contemplated of applying that principle.

Figure 1:
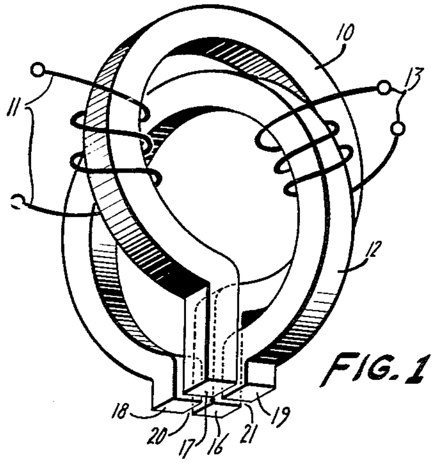
FIG. 1 is an enlarged perspective view illustrating a sensing device embodying the present invention.

Referring to the drawings and particularly to FIG. 1, the sensing device illustrated therein comprises a first core member 10 provided with an energizing winding 11 which may be connected to a suitable source of voltage (not shown), and a second core member 12 provided with a sensing winding 13 which may be connected to any suitable utilization device (not shown). Core member 10 has a pair of pole tips 16 and 17 and core member 12 has a pair of pole tips 18 and 19. Each of the four pole tips is flat and is disposed in a plane so as to define a pair of intersecting slots 20 and 21. As shown more in detail in FIG. 2, the pole tips 16 and 17 of core member 10 are arranged diagonally adjacent to each other and the pole tips 18 and 19 of core member 12 are also arranged diagonally adjacent to each other. As a result, the inner edges of the pole tips 16, 17, 18 and 19 define the intersecting slots 20 and 21.

Figures 2, 2B, 2C, 3, 4, 5:
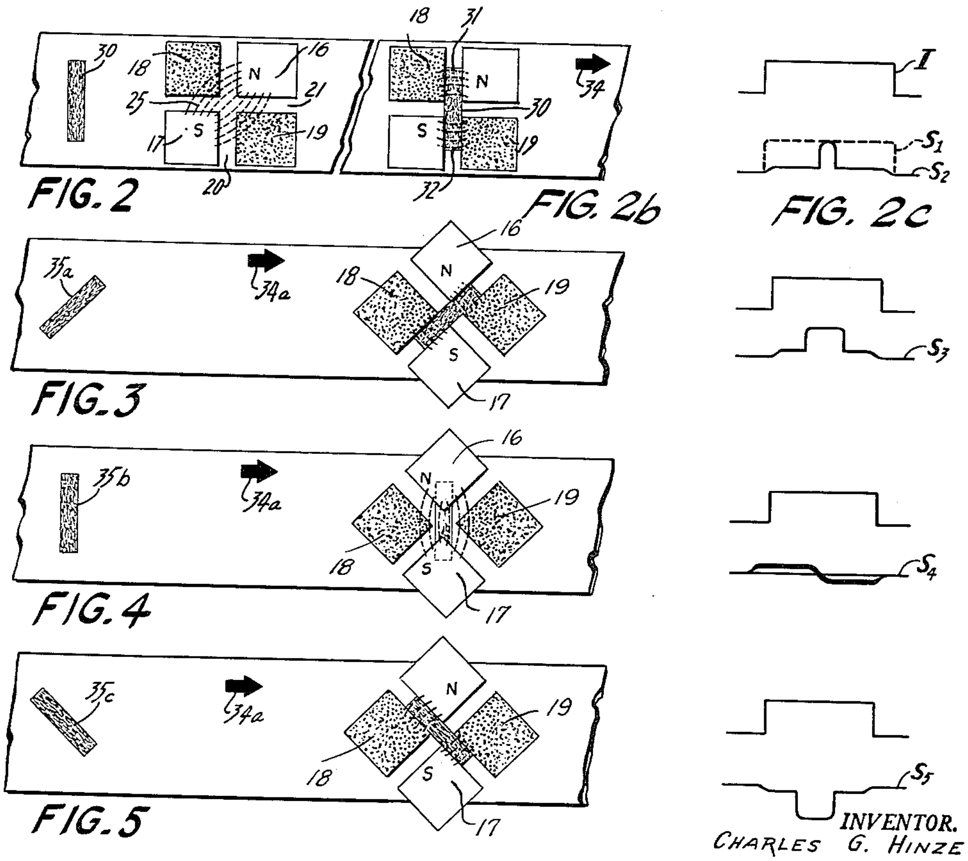
FIG. 2 illustrates diagrammatically a sensing operation and the signal obtained therefrom.
FIGS. 3 through 5 are views illustrating diagrammatically how the sensing device shown in FIG. 1 may be employed as an angle sensitive device.

When energizing winding 11 is supplied with a current pulse represented by curve I in FIG. 2*c*, flux is caused to flow around core member 10 through its air gap, creating a magnetically north pole at pole tip 16 and a magnetically south pole at pole tip 17. A magnetic field 25, therefore, extends between pole tips 16 and 17 whenever winding 11 is energized. This field in the absence of coded indicia is substantially balanced with respect to pole tips 18 and 19 and no signal is induced in sensing winding 13.

However, if an informational bit 30, defined by material having a low magnetic reluctance compared to the surrounding material, is positioned in substantial registry with either slot 20 or 21, the magnetic field 25 becomes unbalanced, as indicated in FIG. 2*b*, causing a signal to be induced in sensing winding 13. It will be seen that when the bit 30 is in the position shown in FIG. 2*b*, flux is caused to flow from pole tip 16 to pole tip 18 through the upper portion 31 of bit 30, from pole tip 18 to pole tip 19 through core member 12, from pole tip 19 to pole tip 17 through the lower portion 32 of bit 30, and from pole tip 17 back to pole tip 16 through core member 10. As a result, a signal represented by curve $S_1$ in FIG. 2*c* is provided at the output terminals of sensing winding 13. Curve $S_2$ indicates a signal which is obtained as the bit 30 is moved relative to the sensing device. It should be understood, of course, that relative movement of the bit with respect to the sensing device is not necessary for producing a signal, since the device is a static type sensing device.

Any suitable means may be employed for providing relative motion between the informational bit 30 and the sensing device for positioning purposes, and since this forms no part of the present invention it has not been shown or described.

FIGS. 3 through 5 illustrate diagrammatically how the device shown in FIG. 1 may be employed as an angle sensitive sensing device. The reading surface of the device illustrated in FIGS. 3 through 5 is identical with that previously described except that, as shown, the device has been rotated counterclockwise 45° while the direction of motion indicated by arrows 34*a* is still horizontal. It will be seen that bits 35*a*, 35*b* and 35*c* which are disposed at three different angles produce three different signals, $S_3$, $S_4$ and $S_5$, respectively, in response to winding 11 being energized and the bits being moved as indicated by the arrows 34. While only three different bit angles are shown, it should be understood that various other angles might also be detected depending on a number of factors such as the reluctance of the material employed to define the bit, the strength of the driving signal and the spacing of the reading surface from the low reluctance material.

Figure 6:
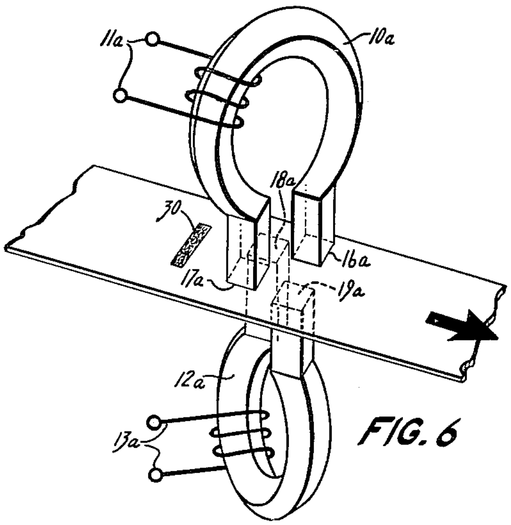
FIG. 6 is a perspective view illustrating a modification of the device shown in FIG. 1.

FIG. 6 illustrates a modification of the sensing device shown in FIG. 1, and is similar in structure and operation thereto except that the core members 10*a* and 12*a* are positioned on opposite sides of the material being sensed. As a result, pole faces 16*a* and 17*a* cooperate with pole faces 18*a* and 19*a* to define the reading plane of the device. Drive winding 11*a* and sensing winding 13*a* function in the same manner as described in connection with windings 11 and 13 of FIG. 1; that is, they are coupled together when the low reluctance material is in registry with either of the slots defined by the spaced edges of the pole faces.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A device for sensing indicia defined by material having a different magnetic reluctance than its environment comprising a first core member having a pair of spaced adjacently positioned pole tips, means upon said core member for energizing said member to produce a magnetic field extending normally directly from pole tip to pole tip, a second core member spaced in its entirety from said first core member and having a pair of pole tips located adjacent the pole tips of said first core member at opposite sides of the magnetic field established between the pole tips of said first core member, and a sensing winding upon said second core member operative to produce a signal in response to variations in the normal configuration of the magnetic field between the pole tips of said first core member as produced by the proximity, to the pole tips, of a magnetic material of different reluctance than its environment.

2. A device for sensing indicia defined by material having a lower magnetic reluctance than its environment comprising a first core member of U-shaped conformation having a pair of spaced, adjacently positioned pole tips possessing frontal faces disposed in a common plane, means upon said core member for energizing said member to produce a magnetic field of normally symmetrical configuration extending directly from pole tip to pole tip, a magnetically independent second core member of U-shaped conformation spaced in its entirety from said first core member and having a pair of pole tips located adjacent to, yet spaced from, the pole tips of said first core member symmetrically at opposite sides of the magnetic field established between the pole tips of said first core member, the pole tips of said second core member possessing frontal surfaces disposed in the plane defined by the frontal surfaces of the pole tips of said first core member, and a sensing winding upon said second core member operative to produce a signal in response to variations in the symmetrical configuration of the magnetic field between the pole tips of said first core member as produced by the proximity to said pole tips, of a magnetic material of lower reluctnace than its environment.

References Cited in the file of this patent

UNITED STATES PATENTS

| | | |
|---|---|---|
| 2,700,703 | Nordyke | Jan. 25, 1955 |
| 2,712,572 | Roberts | July 5, 1955 |
| 2,803,708 | Camras | Aug. 20, 1957 |
| 2,873,319 | Mee | Feb. 10, 1959 |
| 2,929,670 | Garrity | Mar. 22, 1960 |

FOREIGN PATENTS

| | | |
|---|---|---|
| 168,570 | Germany | June 25, 1951 |
| 174,220 | Austria | Mar. 10, 1953 |
| 707,699 | Great Britain | Apr. 21, 1954 |